United States Patent
Plotkin et al.

(10) Patent No.: US 10,078,216 B2
(45) Date of Patent: Sep. 18, 2018

(54) OPTICAL SCANNING APPARATUS, SYSTEM AND METHOD

(71) Applicant: HEWLETT-PACKARD DEVELOPMENT COMPANY, L.P., Houston, TX (US)

(72) Inventors: Michael Plotkin, Rehovot (IL); David K. Towner, Boise, ID (US); Haim Livne, Kfar-Sava (IL); Mark Shechterman, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 75 days.

(21) Appl. No.: 15/097,886

(22) Filed: Apr. 13, 2016

(65) Prior Publication Data

US 2016/0223811 A1 Aug. 4, 2016

Related U.S. Application Data

(63) Continuation of application No. 14/122,662, filed as application No. PCT/US2011/040094 on Jun. 10, 2011, now Pat. No. 9,348,137.

(51) Int. Cl.
*G02B 26/08* (2006.01)
*G02B 26/12* (2006.01)
*G03G 15/043* (2006.01)

(52) U.S. Cl.
CPC ......... *G02B 26/123* (2013.01); *G02B 26/124* (2013.01); *G02B 26/125* (2013.01); *G02B 26/127* (2013.01); *G02B 26/128* (2013.01); *G03G 15/0435* (2013.01)

(58) Field of Classification Search
CPC .. G02B 26/123; G02B 26/124; G02B 26/125; G02B 26/10; G02B 27/17; G02B 19/0057; G02B 27/09; G02B 27/0961; G02B 27/0966; G03G 15/04; H01S 3/04; H01S 5/4025; G01D 9/42
USPC ............................. 359/204.1, 206.1, 215.1
See application file for complete search history.

(56) References Cited

U.S. PATENT DOCUMENTS

| 4,445,126 | A | 4/1984 | Tsukada |
|---|---|---|---|
| 4,474,422 | A | 10/1984 | Kitamura |
| 4,796,962 | A | 1/1989 | Dejager |
| 5,272,715 | A | 12/1993 | Guerin |
| 5,300,956 | A | 4/1994 | Ohta et al. |

(Continued)

FOREIGN PATENT DOCUMENTS

| CN | 2862070 Y | 1/2007 |
|---|---|---|
| EP | 0641116 | 3/1995 |

(Continued)

*Primary Examiner* — Euncha Cherry
(74) *Attorney, Agent, or Firm* — HP Inc. Patent Department

(57) ABSTRACT

An optical scanning apparatus includes: an array of optical emitters to provide a plurality of optical beams; a plurality of corresponding microlenses to receive the optical beams; and a variable collimator to receive the plurality of optical beams from the microlenses. The microlenses and variable collimator are arranged to decouple the illumination spot size of the optical beams from the illumination spot separation of the optical beams such that the illumination spot size and the illumination spot separation at a scanning surface are independently controllable.

20 Claims, 5 Drawing Sheets

(56) References Cited

U.S. PATENT DOCUMENTS

| | | |
|---|---|---|
| 5,469,290 A | 11/1995 | Maeda |
| 5,619,245 A | 4/1997 | Kessler et al. |
| 5,745,153 A | 4/1998 | Kessler et al. |
| 5,748,223 A | 5/1998 | Ito |
| 5,786,594 A | 7/1998 | Ito |
| 6,061,079 A | 5/2000 | Ota et al. |
| 6,061,080 A | 5/2000 | Harris |
| 6,396,616 B1 | 5/2002 | Fitzer et al. |
| 6,433,934 B1 | 8/2002 | Reznichenko et al. |
| 6,603,498 B1 | 8/2003 | Konnunaho et al. |
| 7,088,353 B2 * | 8/2006 | Fujii .................. H04N 9/3129 345/204 |
| 7,674,999 B2 | 3/2010 | Jennings et al. |
| 7,688,876 B2 | 3/2010 | Chabinyc et al. |
| 2004/0008744 A1 | 1/2004 | Okazaki et al. |
| 2004/0263986 A1 | 12/2004 | Brown |
| 2010/0309561 A1 | 12/2010 | Towner |

FOREIGN PATENT DOCUMENTS

| | | |
|---|---|---|
| JP | 5669610 | 6/1981 |
| JP | H07-1749974 | 7/1995 |
| JP | H11-070698 | 3/1999 |
| JP | 2002-202468 | 7/2002 |
| JP | 2002-287060 | 10/2002 |
| JP | 2008-275711 | 11/2008 |
| KR | 20040090814 A | 10/2004 |

\* cited by examiner

OPTICAL SCANNING APPARATUS, SYSTEM AND METHOD

STATEMENT REGARDING FEDERALLY SPONSORED RESEARCH OR DEVELOPMENT

N/A

BACKGROUND

Laser printers and related optical imaging systems often employ a raster-scanned optical beam or beams produced by an optical source to render images (e.g., a printed image). For example, early laser printers typically employed a single raster scanned optical beam, often generated by a laser or similar optical emitter. To render an image, the single optical beam was focused to form an illumination spot on a photoconductive surface. The optical beam was modulated to modulate the illumination spot as it was scanned across the photoconductive surface. The scanned illumination spot exposed a latent image along a scan line on the photoconductive surface yielding a pattern of relatively charged and uncharged surface regions along a length of the scan line. Using some form of toner or ink (e.g., solid or liquid) that differentially adheres to the charged and uncharged regions, the latent image was developed. The toner, patterned according to the latent image, was then transferred to paper or a similar substrate to render the printed image.

Over time, an interest in greater printing speed and increased overall throughput, has given rise to the use of multi-beam laser scanning units (LSUs) that provide more than one optical beams. In printers that employ multi-beam LSUs, each of the multiple beams produces an independently modulated illumination spot. In turn, each separate modulated illumination spot is used to expose a corresponding separate scan line on the photoconductive surface. Together the modulated illumination spots and resulting separate scan lines enable printed images to be produced at a much faster rate than is generally possible with single beam LSUs. However, while adding optical beams enables faster printing and a concomitant increase in throughput of a printer, using multiple optical beams does present some challenges not present in the single beam LSU. For example, along with the use of multiple optical beams comes the problem of producing illumination spots having a desired or targeted spot size while simultaneously maintaining a desired or targeted separation or spacing between the scan lines or equivalently between the illumination spots at the photoconductive surface.

One approach to providing simultaneous, substantially independent, control of both an illumination spot size and an effective illumination spot spacing (or more properly control of scan line spacing) is to tilt a linear arrangement or pattern of the illumination spots relative to a scan direction of the photoconductive surface. In particular, the tilt may be used to establish a target spacing between the scan lines while optics of the LSU is employed to separately determine the target spot size of the illumination spots on the photoconductive surface. A tilt angle of about 86.4 degrees, for example, may be used to produce a tilted linear pattern of illumination spots that is oriented almost parallel to an optical scan direction at the scanning surface to provide a target scan line spacing of about 0.03125 millimeter (mm) or about 32 lines/mm for an actual illumination spot spacing of about 0.5 mm. Further, the scan line spacing may be adjusted by a substantially arbitrary amount through fine-tuning of the tilt angle.

Unfortunately, while tilting the linear pattern of illumination spots may enable independent control of spot size and spacing of the illumination spots, linear pattern tilting tends to introduce other issues that effectively limit a practical number of optical beams that may be employed. In particular, the number of optical beams as well as a maximum achievable scan width (i.e., scan line length) may be severely limited due to focal plane separation, wherein each illumination spot follows a separate focal surface during scanning and those focal surfaces are separated in a focus direction (i.e., axial direction) by a distance that exceeds a depth of focus of the optical system. Moreover, it may become difficult to simultaneously achieve acceptable optical aberration correction for a large number of beams at the final image in the multi-beam LSU when the beams are spread relatively far apart in the scan direction as a result of the tilted linear pattern.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Figure 1A:
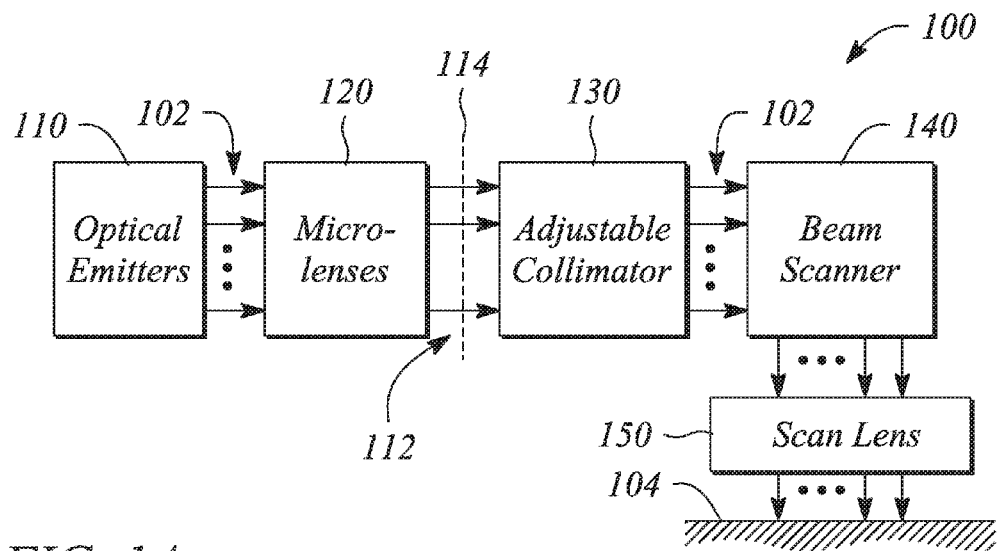
FIG. 1A illustrates a schematic diagram of an optical emitter array scanning apparatus, according to an example of the principles described herein.

Certain examples have other features that are one of in addition to and in lieu of the features illustrated in the above-referenced figures. These and other features are detailed below with reference to the preceding drawings.

DETAILED DESCRIPTION

Examples in accordance with the principles described herein provide scanning of multiple optical beams produced by an array of optical emitters. In particular, an optical beam size and a beam separation or equivalently an illumination spot size and an illumination spot separation or spacing at an image plane may be determined independently in optical emitter array scanning, according to examples of the principles described herein. Independent determination of spot size and spot separation may facilitate increasing a number of optical beams or illumination spots without experiencing adverse effects due to focal surface separation and optical aberrations in a final image as well as without a substantial loss in optical efficiency, for example. In addition, a linear array of illumination spots that is nearly perpendicular to an in-scan direction or substantially parallel to a cross-scan or process direction may be employed. Moreover, the illumination spot separation may be continuously adjustable to provide real-time scan line spacing control, according to examples of the principles described herein. Optical emitter scanning has application to a variety of areas including, but not limited to, a multi-beam laser scan unit (LSU) used in laser printers and related optical scanning systems.

For example, consider a typical imaging system of an axial imaging system type (i.e., optical systems having a single optical axis) used to provide multiple optical beam scanning. Such a typical imaging system generally provides a particular or first magnification to achieve a target illumination spot size as well as to maintain or achieve an acceptable optical power throughput for the imaging system. However, given available emitters, the first magnification is generally not appropriate for also achieving an illumination spot separation or spacing consistent with a target spacing of scan lines produced by the imaging system. In particular, an acceptable target illumination spot separation or spacing generally requires a magnification that differs from the first magnification used to achieve the target illumination spot size. As such, a second magnification is required to achieve the target spacing of the illumination spots (or scan lines) and the required second magnification is generally different from, and in some instances substantially different from, the first magnification. Unfortunately, according to paraxial optics an axial imaging system can have one and only one magnification in any given axial section, which precludes having both of the first magnification and the substantially different second magnification.

In particular, axial imaging systems have a unique optical axis (or symmetry axis) that, ignoring deviations (e.g., due to plane mirrors, prisms, etc.), defines a straight line passing through a center of curvature, or alternatively another center of symmetry, of each optical surface or optical element in the axial imaging system. A magnification of the axial imaging system simultaneously determines both a limiting size of an image (i.e., a chief ray height=Y*) and a limiting angle of a beam that forms that image (i.e., a marginal ray angle=U). Further, after allowing for the refractive index (n) in a space of each image, a product of the chief ray height Y* and the marginal ray angle U is a constant at any object or image location within the optical system. This constant is known as the Paraxial Invariant (I), or alternatively as the Lagrange Invariant, of the axial imaging system. More particularly, at any image location within an axial imaging system, the Paraxial Invariant I is given by equation (1)

$$I = -n \cdot U \cdot Y^* \quad (1)$$

where n is an index of refraction.

For existing optical emitters, the aforementioned conflict between the first magnification and the second magnifications arises first, because a spacing between the optical emitters is significantly larger than the target scan line spacing and, second, because a divergence angle of optical beams produced by the optical emitters is significantly larger in magnitude than a target image beam convergence angle. Consequently, the Paraxial Invariant I tends to be much larger at the optical emitter than is desired at a final scanned image. While the Paraxial Invariant I at the emitter may be reduced to substantially match that of the final image by capturing light in only a very small cone angle at the emitter, this approach is largely impractical because most of the optical power produced by the emitter is lost, resulting in insufficient or unacceptable remaining optical power throughput.

Of course, an axial imaging system is not required to exhibit rotational symmetry about its optical axis. In particular, axial imaging systems may be anamorphic having different paraxial properties in each of two orthogonal axial sections, or principal sections (e.g., such as an XZ section and a YZ section were the optical axis is in the Z direction). While an anamorphic axial imaging system may have a different Paraxial Invariant in each principal section, equation (1) applies independently in each principal section and the axial imaging system, whether anamorphic or rotationally symmetric, may have only one magnification in any principal section. Hence, no axial imaging system can have both a first magnification for achieving the target illumination spot size and simultaneously a different second magnification for achieving the target illumination spot separation.

Examples of the principles described herein provide optical emitter array scanning such as may be used in a multi-beam LSU having a capability to independently and simultaneously achieve both the target illumination spot size and the target illumination spot separation at a scanning surface. In particular, microlenses dedicated to individual beams are employed in addition to a variable collimator, in some examples, to substantially decouple the illumination spot size and the illumination spot separation determinations. By decoupling the determinations of illumination spot size and illumination spot separation, the limitations associated with the Paraxial Invariant of axial image systems may be substantially circumvented, according to various examples of the principles described herein.

Herein, the term 'in-scan direction' is defined as a direction in which an optical beam or equivalently an illumination spot produced by the optical beam is or may be scanned across a scanning surface by optical components of a scanning optical system. For example, the in-scan direction may correspond to a horizontal direction across the scanning surface. The scanning surface may be a rotating cylinder or drum and the in-scan direction may be substantially parallel to an axis of rotation of the drum, for example. Scanning in the in-scan direction may be produced by a rotating mirrored polygon that reflects the optical beam, for example. As the mirrored polygon rotates, an angle of deviation of the reflected optical beam varies to scan the optical beam and to similarly vary a position of a corresponding illumination spot on a scanning surface.

In contrast, the term 'cross-scan direction' or equivalently 'process direction' refers to a direction that is substantially orthogonal or perpendicular to the in-scan direction, as defined herein. According to some examples, a mechanical motion of the scanning surface may provide scanning in the cross-scan direction. For example, scanning in the cross-scan direction may be provided by rotation of a drum-shaped photoconductive scanning surface in a laser printer. In general, scanning that employs mechanical motion of the scanning surface (e.g., a photoconductive surface) in the cross-direction is much slower than scanning in the in-scan direction using an optical means of scanning.

Also herein, the terms 'in-scan direction' and 'cross-scan direction' are defined and generally employed to be local directions based on a local coordinate system associated with a central ray of an optical beam. In particular, the in-scan direction is defined at any given point along an optical path of the optical beam as a direction that corresponds to a direction of the in-scan direction at the scanning surface. As such, rotations, reflections and other changes in orientation and direction of the optical beam along the optical path may change the in-scan and cross-scan directions of the local coordinate system relative to a global coordinate system. However, the in-scan and the cross-scan directions remain fixed and well defined relative to the local coordinate system of the optical beam at any point along the optical path followed by the optical beam.

Further, as defined herein, optical power of a lens or a lens element (e.g., a microlens element) is the inverse or the reciprocal of a focal length of the lens or lens element. For example, a lens element having a focal length of minus 40 millimeters (mm) has an optical power of minus 0.025/mm, by definition herein. In general, converging lens elements have a positive optical power and are thicker at a center of the lens than at an edge. In contrast, diverging lens elements generally have a negative optical power and are thinner at a center of the lens than at an edge of the lens. Furthermore and by definition, an anamorphic lens element is not rotationally symmetric about an optical axis but instead has a different optical power in two orthogonal directions or principal sections, such as the in-scan direction and the cross-scan direction. In addition, the anamorphic lens element has at least one anamorphic surface, by definition. An anamorphic surface has a different radius of curvature in two orthogonal directions (e.g., in the in-scan direction and in the cross-scan direction). Further, a cylindrical surface may be considered as a special type of a toric surface in which one of the radii of curvature is substantially infinite, by definition herein.

The term, 'convergence' of an optical beam refers to and is defined herein as a state or angle of either convergence or divergence. An optical beam that emerges from a lens or lens element with positive value of convergence, for example, converges toward a focus and forms a real image. An optical beam that emerges from a lens or lens element with a negative value of convergence is diverging from an apparent focus and forms a virtual image. As such, both convergence with a positive value and convergence with a negative value (i.e., divergence) are referred to herein as convergence unless otherwise expressly noted.

Herein and with respect to emitters, 'fast-axis' and 'slow-axis' refer by definition to directions, or more particularly to sections, of maximum and minimum negative convergence (i.e., divergence), respectively. In particular, a negative convergence angle or 'divergence angle' of an optical beam produced by an optical emitter as a function of rotation about a central ray may be generally described as an ellipse. The rotationally ellipse-shaped divergence angle (i.e., elliptical divergence angle) of the optical beam may be related to an asymmetrical aperture of the emitter, for example (e.g., an edge emitting laser). A major axis of the ellipse represents a section or direction of maximum divergence angle while a minor axis of the ellipse represents the section of direction of minimum divergence angle. Hence, a direction parallel to the major axis of the ellipse (i.e., maximum divergence section) is referred to as the fast-axis direction and a direction parallel to the minor axis of the ellipse (i.e., minimum divergence section) is referred to as the slow-axis direction.

Further, an angular intensity profile of an optical beam produced by an optical emitter (e.g., a single-mode laser emitter) may be generally approximated as a Gaussian function. Such an optical beam has no clearly defined edges and its divergence is conventionally defined as an angle at which the beam intensity has dropped to half of its peak value, often referred to as either a half-width-half-maximum (HWHM) angle or a full-width-half-maximum (FWHM) angle. By definition HWHM angle equals one half of the FWHM angle. Herein, HWHM angle will be employed unless otherwise stipulated. Moreover, herein divergence angles of optical beams emitted by optical emitters are generally expressed in terms of half-width-half-maximum (HWHM) intensity values, unless otherwise stipulated. For example, herein a 12-degree divergence angle is an angle determined at the HWHM intensity of an optical beam.

HWHM divergence angles are properties only of the optical emitter. On the other hand, marginal ray angles discussed hereinbelow are properties only of an optical system. Herein, a marginal ray is defined as the outermost ray from an on-axis object point capable of passing through the optical system in a specified principal section. Nevertheless, in an efficient optical scanning apparatus or imaging system using various types of available optical emitters, the marginal ray angles of the optical apparatus or imaging system at a location of the optical emitters are often selected to be numerically similar to the corresponding HWHM divergence angles of the optical emitters, according to various examples herein. Thus, optical characteristics of microlenses described herein by way of their effects on HWHM divergence angles are substantially the same as they would be if described by way of their effects on marginal ray angles, for example.

As used herein, the article 'a' is intended to have its ordinary meaning in the patent arts, namely 'one or more'. For example, 'a microlens' means one or more microlenses and as such, 'the microlens' means 'the microlens(es)' herein. Also, any reference herein to 'top', 'bottom', 'upper', 'lower', 'up', 'down', 'front', back', 'left' or 'right' is not intended to be a limitation herein. Herein, the terms 'about' and 'substantially' when applied to a value generally means plus or minus 10% unless otherwise expressly specified. Moreover, examples herein are intended to be illustrative only and are presented for discussion purposes and not by way of limitation.

Figure 1B:
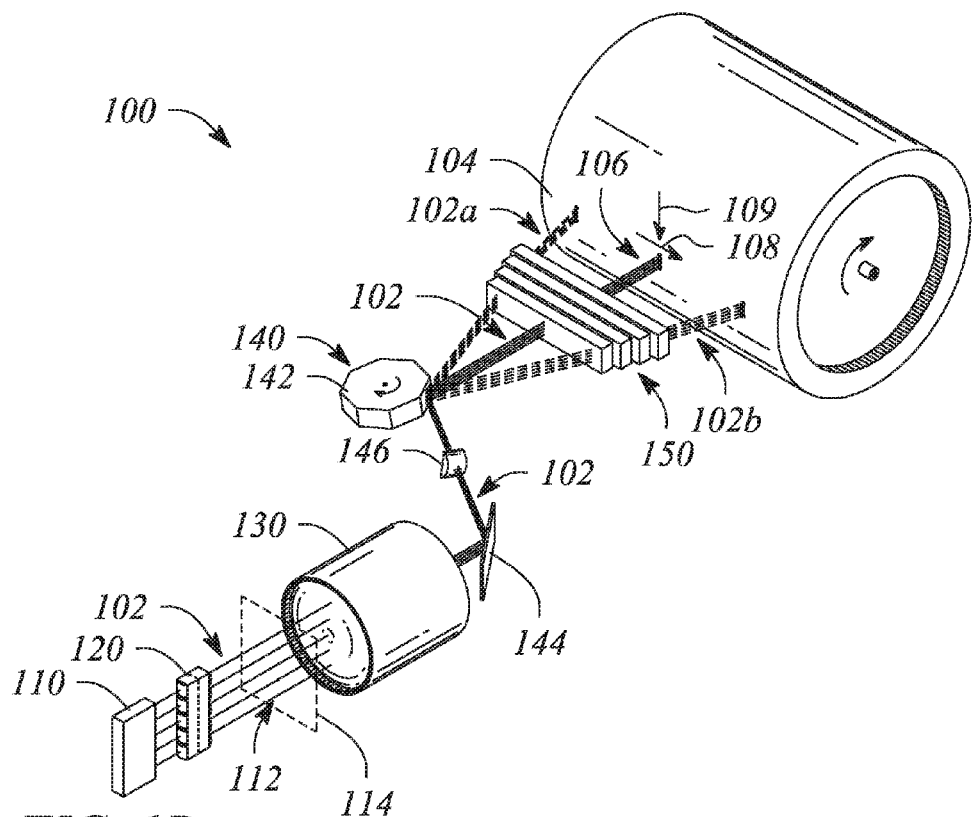
FIG. 1B illustrates a perspective view of the optical emitter array scanning apparatus of FIG. 1A, according to an example of the principles described herein.

FIG. 1A illustrates a schematic diagram of an optical scanning apparatus 100, according to an example of the principles described herein. FIG. 1B illustrates a perspective view of the optical scanning apparatus 100 of FIG. 1A, according to an example of the principles described herein. The optical scanning apparatus 100 may be used to scan optical beams 102 across a scanning surface 104, for example. The optical beams 102 define or produce illumination spots 106 on the scanning surface 104 as the optical beams 102 are scanned. The optical scanning apparatus 100 scans the optical beams 102 (or equivalently the illumination spots 106) horizontally across the scanning surface 104 in an in-scan direction indicated by an arrow 108. Motion of the scanning surface 104 in a direction that is substantially perpendicular to the in-scan direction provides cross-scan direction or 'process direction' scanning of the optical beams 102, according to some examples. Another arrow 109 indicates a cross-scan direction at the scanning surface 104 in FIG. 1B. Dashed lines illustrate optical beams 102 at a beginning (i.e., 102*a*) and an end (i.e., 102*b*) of a scan in the in-scan direction. A limited number of optical beams 102 (e.g., five) is illustrated in FIG. 1B for simplicity of illustration and not by way of limitation.

Figure 1C:
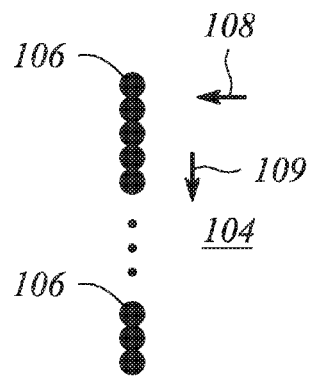
FIG. 1C illustrates a plan view of a plurality of illumination spots on a scanning surface, according to an example of the principles described herein.

The illumination spots 106 are arranged in a linear arrangement on the scanning surface 104 oriented substantially perpendicular to the in-scan direction (i.e., substantially parallel to the cross-scan direction), according to various examples. FIG. 1C illustrates a plan view of a plurality of illumination spots 106 on the scanning surface 104, according to an example of the principles described herein. In particular, as illustrated in FIG. 1C the illumination spots 106 are arranged in a row or a line that is substantially parallel to the cross-scan direction (arrow 109) and substantially perpendicular to the in-scan direction (arrow 108).

In some examples, the scanning surface 104 may be a photoconductive drum of a printer, for example. Such a photoconductive drum as the scanning surface 104 is illustrated in FIG. 1B, for example. Rotation of the photoconductive drum provides the motion of the scanning surface 104 in the cross-scan direction, as mentioned above. For example, the scanning surface 104 as the photoconductive drum may rotate about an axis parallel to the in-scan direction 108 to provide the movement in the cross-scan direction 109. The illumination spots 106 may be used to expose and, when modulated according to image data, to define a pattern on the photoconductive drum, for example. In other examples, the scanning surface 104 may comprise another type of photosensitive surface such as, but not limited to, a planar surface or a surface of a belt, for example.

As illustrated in FIGS. 1A and 1B, the optical scanning apparatus 100 comprises an array of optical emitters 110. The array of optical emitters 110 is configured to provide a plurality of optical beams 102. In some examples, the optical emitters 110 are lasers or laser emitters. For example, the optical emitters 110 may comprise an array of laser diodes 110. The laser diodes 110 may be edge emitting laser diodes, for example. In some examples, the edge emitting laser diodes used as the optical emitters 110 may operate at a wavelength from about 600 nanometers (nm) to about 900 nm. For example, the operational wavelength may be about 650 nm. In another example, the operational wavelength may be about 820 nm. An operational output power of each one of the edge emitting laser diodes may be about 30 milliwatts (mW), for example. In other examples, the laser diodes may be surface emitting laser emitters such as a vertical cavity surface emitting laser (VCSEL) diode or a vertical external cavity surface emitting laser (VECSEL) diode.

The laser diodes 110 of the array may be provided singly (i.e., discrete laser diodes) or combined in groups on a common substrate, according to various examples. For example, the laser diodes that make up the array of optical emitters 110 may be integrated together on a single or common substrate. In other examples, another type of optical source other than a laser diode may be employed in the array of optical emitters 110. The other type of optical source may be a non-diode laser such as, but not limited to, a gas laser, a solid-state laser or a dye laser, for example. In yet other examples, the optical emitters 110 of the array may comprise either light emitting diodes (LEDs) or superluminescent diodes.

In some examples, the optical emitters 110 are arranged in a linear array. For example, the array of optical emitters 110 may comprise a plurality of laser diodes aligned in a spaced apart row that defines the linear array. The laser diodes may be spaced apart by about 70 micrometers (µm), for example. The spaced apart row may comprise a plurality of edge emitting laser diodes arranged along an edge of a common substrate, for example. In another example, the linear array may comprise a row of spaced apart VCSELs on a surface of a substrate. In other examples, the optical emitters 110 are arranged in other than a linear array.

In some examples, the beam spacing at the scanning surface 104 may be about 31 µm. In some examples, the optical beams 102 may comprise more than twenty separate optical beams 102 (e.g., >22). For example, between about thirty and about forty optical beams 102 may be employed. In another example, more than about forty optical beams 102 may be employed.

As illustrated in FIGS. 1A and 1B, the optical scanning apparatus 100 further comprises a plurality of microlenses 120. The plurality of microlenses 120 is configured to receive the plurality of optical beams 102 provided by the array of optical emitters 110. Each microlens 120 of the plurality has a separate optical axis. As such, the plurality of microlenses 120 lacks a common optical axis and therefore does not constitute an axial imaging system.

In general, the microlenses 120 may be anamorphic, each microlens 120 having a first set of optical properties in a first principal section and a second set of optical properties in a second principal section orthogonal to the first principal section. Each microlens 120 is configured to produce an image of a corresponding optical emitter 110 and the plurality of microlenses 120 is configured to collectively produce a plurality of optical emitter images that together form an image of the emitter array. In particular, the plurality of emitter images forms an intermediate image 112 of the array of optical emitters 110. The intermediate image 112 comprises a plurality of spots, each spot corresponding to a different one of the optical beams 102. Further, the intermediate image 112 of the emitter array is formed at substantially unity magnification with respect to the emitter array (i.e., unity array magnification), according to some examples.

According to various examples, each microlens 120 of the plurality corresponds to a different one of the optical beams 102 from each of the optical emitters 110. As such, each optical emitter 110 is individually or separately imaged by a different respective one of the microlenses 120 to form an intermediate image of the optical emitter 110 at an intermediate image plane 114. Specifically, the intermediate image of the optical emitter 110 represents a particular one of the spots of the intermediate image 112. For example, each microlens 120 of the plurality may be coupled to a different respective one of the optical emitters 110. The microlenses 120 may be arranged in a linear array that corresponds to a linear array of the optical emitters 110, for example. In such an arrangement, each microlens 120 receives and images only the optical beam 102 produced by the respective coupled optical emitter 110, for example. According to various examples, the intermediate image 112 may be either a real image or a virtual image. When the intermediate image 112 is a real image, the intermediate image 112 and intermediate image plane 114 are located along an optical path of the optical beams 102 after or following the microlenses 120, as illustrated in FIGS. 1A and 1B.

Microlenses 120 that are anamorphic may operate at a first magnification in a first principal section and a second magnification in a second principal section. Accordingly, anamorphic microlenses 120 may be configured to receive an input optical beam 102 from a given optical emitter 110 having a particular beam ellipticity and to transform that optical beam 102 into an output optical beam 102 at an intermediate image location (e.g., the intermediate image plane 114) having a significantly different ellipticity. More particularly, a laser diode or another optical emitter 110 may emit an elliptical beam having a particular divergence angle (a HWHM angle, for example) in a fast-axis direction of the optical emitter 110 and having a different and smaller divergence angle in a slow-axis direction of the optical emitter 110. Unless otherwise specified herein, beam angles and ray angles are paraxial geometrical properties of emitters and optical systems and are unaltered by diffraction effects.

The microlenses 120 may be employed to maximize an efficiency of light collection from the optical emitters 110, for example. To maximize the light collection efficiency, the microlenses 120 may receive an optical beam 102 from each of the optical emitters 110 having a relatively large marginal ray angle in the fast-axis direction of the optical emitter 110 while simultaneously having a relatively smaller marginal ray angle in the slow-axis direction of the optical emitter 110. Moreover, the microlenses 120 may also act to significantly reduce the optical beam marginal ray angles at the intermediate image 112 compared to marginal ray angles at the optical emitter 110. Furthermore the reduction of the optical beam marginal ray angles may be realized anamorphically. As such, the imaging of the optical emitters 110 by the microlenses 120 to form the intermediate image 112 may be characterized by or described in terms of three magnification values.

In particular, each of the microlenses 120 images a respective optical emitter 110 in a principal section corresponding to the fast-axis direction of the optical emitter 110. Imaging in the fast-axis direction comprises receiving a diverging input optical beam from the optical emitter having a fast-axis marginal ray angle $U_{fast}$ and producing an output optical beam that converges toward the intermediate image 112 having a marginal ray angle $U'_{fast}$. A first of the three magnification values is a fast-axis magnification $M_{fast}$ associated with the fast-axis imaging. The fast-axis magnification $M_{fast}$ may be defined as given by equation (2).

$$M_{Fast} = \frac{\tan(U_{Fast})}{\tan(U'_{Fast})} \qquad (2)$$

Each of the microlenses 120 further images a respective optical emitter 110 in a principal section corresponding to the slow-axis direction of the optical emitter 110. Imaging in the slow-axis direction comprises receiving a diverging input optical beam 102 from the optical emitter 110, the diverging input optical beam 102 having a slow-axis marginal ray angle $U_{Slow}$, and producing an output optical beam 102 that converges toward the intermediate image 112 having a marginal ray angle $U'_{Slow}$. A second of the three magnification values is a slow-axis magnification $M_{Slow}$ associated with the slow-axis imaging. The slow-axis magnification $M_{Slow}$ may be defined as given by equation (3).

$$M_{Slow} = \frac{\tan(U_{Slow})}{\tan(U'_{Slow})} \qquad (3)$$

According to some examples, one or both of the fast-axis magnification $M_{Fast}$ and the slow-axis magnification $M_{Slow}$ of the microlenses 120 may be in a range between about 10 and about 100. For example, one or both of the fast-axis magnification $M_{Fast}$ and the slow-axis magnification $M_{Slow}$ may be greater than about 10. In another example, one or both of the fast-axis magnification $M_{Fast}$ and the slow-axis magnification $M_{Slow}$ may be between about 60 and about 10. For example, the fast-axis magnification $M_{Fast}$ may be about 50 and the slow-axis magnification $M_{Slow}$ may be about 20.

A third magnification of the three magnifications is an array magnification $M_{Array}$ at which all of the optical emitters 110 (e.g., an array) are collectively imaged onto the intermediate image 112. The array magnification $M_{Array}$ may be defined as a distance $L_{Int\ Image}$ between images of two optical emitters 110 at the intermediate image plane 114 divided by a distance $L_{Array}$ between the corresponding two optical emitters 110 in the array. Hence, the array magnification $M_{Array}$ may be given by equation (4).

$$M_{Array} = \frac{L_{Int\ Image}}{L_{Array}} \qquad (4)$$

The intermediate image 112 formed by the microlenses 120 functions as an object for the subsequent optical components of the optical scanning apparatus 100 and is reimaged by those optical components as a final image on the scanning surface 104. The reimaging has an associated magnification for each principal section of the optical scanning apparatus 100. In particular, the reimaging magnification in the in-scan direction is designated as $M_{In-Scan}$ and the reimaging magnification in the cross-scan direction is designated as $M_{Cross-Scan}$. For descriptive simplicity where it is not necessary to maintain the distinction between the respective in-scan direction and cross-scan direction reimaging magnifications, the reimaging magnifications are collectively referred to herein as a reimaging magnification $M_{Reimaging}$.

According to some examples, components of the optical scanning apparatus 100 following microlenses 120 and the intermediate image 112 of the optical emitters 110 formed by the microlenses 120 substantially provide an axial imaging system. The axial imaging system provided by these components may be an anamorphic axial imaging system, for example. Consequently, for a particular intermediate image, the same in-scan direction reimaging magnification $M_{In-Scan}$ determines both the in-scan direction marginal ray angle of the illumination spots 106 and therefore, the in-scan direction spot size, and the in-scan direction separation of the illumination spots 106, in the final image at the scanning surface 104. Similarly, for a particular intermediate image, the same cross-scan direction reimaging magnification $M_{Cross-Scan}$ determines both the cross-scan direction marginal ray angle of the illumination spots 106 and therefore, the cross-scan direction spot size, and the cross-scan direction separation of the illumination spots 106, in the final image at the scanning surface 104. Thus, once the marginal ray angles at the intermediate image have been determined, the in-scan direction and the cross-scan direction reimaging magnifications $M_{In-Scan}$, $M_{Cross-Scan}$ ultimately determine the respective in-scan direction and cross-scan direction marginal ray angles of optical beams 102 at the final image as well as the in-scan direction and cross-scan direction sizes of the illuminations spots. In addition, once the separation of focused spots at the intermediate image has been determined, these same magnifications also ultimately determine the separation of the illumination spots 106. The subsequent optical components thus act to 'relay' the intermediate image 112 onto the scanning surface 104 with a single magnification in each principal section and without an ability to change a Paraxial Invariant I determined at the intermediate image 112.

In particular, the separation of the illumination spots 106 in the final image (i.e., at the scanning plane 104) is determined by an overall (i.e., end to end) image height magnification between the optical emitters 110 and the final image at the scanning surface 104. In general, the overall image height magnification is the product of array magnification $M_{array}$ and reimaging magnification $M_{Reimaging}$. More particularly, in the cross-scan direction at the final image at the scanning surface 104, a separation distance $L_{Final\ Image}$ between illumination spots 106 is determined by the corresponding optical emitter separation distance in the cross-scan direction $L_{Array}$ multiplied by a product of the array magnification $M_{Array}$ and the cross-scan direction reimaging magnification $M_{Cross-Scan}$ as given by equation (5).

$$L_{Final\ Image} = L_{Array} \cdot (M_{Array} \cdot M_{Cross-Scan}) \quad (5)$$

Since the microlens marginal ray angle magnifications $M_{Fast}$ and $M_{Slow}$ may be determined independently from the array magnification $M_{Array}$, the illumination spot sizes at the final image, which are determined respectively by the in-scan direction and cross-scan direction marginal ray angles of optical beams 102 at the final image, may be determined independently from the separation between adjacent illumination spots 106 at the final image. Thus, a marginal ray angle U" of the illumination spots 106 in the final image is determined by an overall (i.e., end-to-end) marginal ray angle magnification determined by multiplying a selected one of the microlens magnifications $M_{Fast}$ and $M_{Slow}$ by a corresponding one of the reimaging magnifications $M_{In-Scan}$ and $M_{Cross-Scan}$.

In some examples, the slow-axis direction of the optical emitter 110 may be aligned with the cross-scan direction of the optical scanning apparatus 100. In these examples, a cross-scan marginal ray angle $U''_{Cross-Scan}$ of an optical beam 102 forming the final image at the scanning surface 104 may be given by equation (6).

$$U''_{Cross-Scan} = U_{Slow} \cdot \frac{1}{(M_{Slow} \cdot M_{Cross-Scan})} \quad (6)$$

An in-scan direction marginal ray angle $U''_{In-Scan}$ of an optical beam 102 forming the final image at the scanning surface 104 may be given by equation (7).

$$U''_{In-Scan} = U_{Fast} \cdot \frac{1}{(M_{Fast} \cdot M_{In-Scan})} \quad (7)$$

In some examples, the fast-axis direction of the optical emitter 110 may be aligned with the cross-scan direction of the optical scanning apparatus 100 and equation (7) may be rewritten as equation (7a):

$$U''_{Cross-Scan} = U_{Fast} \cdot \frac{1}{(M_{Fast} \cdot M_{Cross-Scan})} \quad (7a)$$

Note that equations (6), (7) and (8) use the approximation that tan(U)=U for small angles. Where any of the various marginal ray angles U and U" are large enough to invalidate this approximation, tan(U) should be substituted for U.

As has been previously discussed, an illumination spot size at the final image is determined by a marginal ray angle or beam convergence angle at that image. More specifically, for a well-corrected optical system having small aberrations, the illumination spot size is determined by diffraction and an illumination spot diameter $D_{In-Scan}$ in the in-scan direction of the optical scanning apparatus 100 may be given by equation (8)

$$D_{In-Scan} = \frac{C \cdot \lambda}{\sin(U''_{In-Scan})} \quad (8)$$

where $\lambda$ represents a wavelength of the optical emitter 110 and a constant C is determined according to a selected spot size definition as well as an intensity distribution of the optical beam 102. In some examples, the constant C has a value between about 0.5 and about 2.0. For the small angles U" characteristic of many printing systems and where angles are expressed in units of radians, equation (8) may be approximated as given by equation (8a).

$$D_{In-Scan} = \frac{C \cdot \lambda}{U''_{In-Scan}} \quad (8a)$$

Further herein, an algebraic sign of the various quantities M, U, U', U", etc., may serve primarily to indicate a whether an imaging transformation acts to form an inverted or non-inverted image. Unless specifically indicated otherwise, examples according to the principles described herein do not depend on the inverting or non-inverting nature of the various imaging transformations and the algebraic signs noted above are unimportant. Therefore, unless otherwise indicated, these quantities may be regarded as directionless magnitudes.

In some examples, each microlens 120 of the plurality comprises a first microlens element to provide fast-axis direction convergence of the corresponding optical beam. Fast-axis convergence, in turn, provides fast-axis imaging of the corresponding optical emitter 110 onto the intermediate image 112. For example, the first microlens element may comprise a cylindrical lens oriented to provide a positive optical power in the fast-axis direction. Further in these examples, each microlens 120 also comprises a second microlens element to provide slow-axis convergence of the corresponding optical beam 102 and, in turn, slow-axis imaging of the corresponding optical emitter 110 onto the intermediate image 112. For example, the second microlens element may comprise a cylindrical lens oriented to provide a positive optical power in the slow-axis direction. Together, the first and second microlens elements act in concert as the microlens 120 to provide beam convergence that defines marginal ray angles at the intermediate image 112 and subsequently at the final image at the scanning surface 104. The marginal ray angles determine the spot size of the corresponding illumination spots 106 at the final image in both principal sections of the optical scanning apparatus 100. In various examples, the first microlens element may be part of a first array of microlens elements and the second microlens element may be part of a second array of microlens elements.

In some examples, the fast-axis direction of the optical emitters 110 of the array is aligned to substantially correspond with the in-scan direction of the optical scanning apparatus 100. For example, the optical emitters 100 of the array may be laser diodes of an edge-emitting laser diode array. Edge-emitting laser diode arrays comprise a plurality of optical emitters 110 formed on a common substrate with the optical emitters 110 typically being spaced apart in a slow-axis direction to form a substantially linear array of optical emitters 110, for example. In such an arrangement, an array of illumination spots 106 in the final image may be substantially aligned in the cross-scan direction. Further, with such an arrangement, a spot separation of the illumination spots 106 at the final image produces a substantially equivalent scan line separation in a scanned image.

Figure 2A:
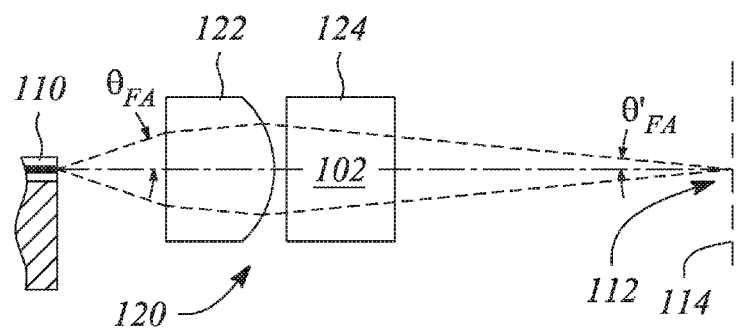
FIG. 2A illustrates a cross-sectional view through a plurality of microlenses, according to an example of the principles described herein.
Figure 2B:
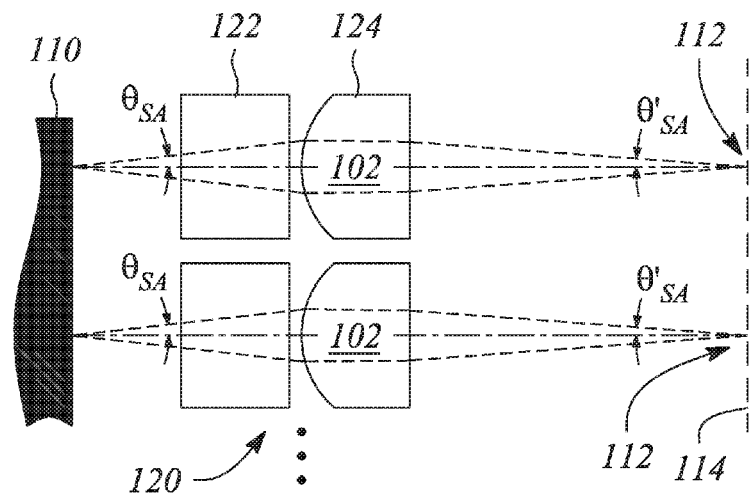
FIG. 2B illustrates a cross-sectional view through the microlenses of FIG. 2A in a direction perpendicular to the cross-section direction of FIG. 2A, according to an example of the principles described herein.

FIG. 2A illustrates a cross-sectional view through the microlenses 120, according to an example of the principles described herein. FIG. 2B illustrates a cross-sectional view through the microlenses 120 of FIG. 2A in a direction perpendicular to the cross-section direction of FIG. 2A, according to an example of the principles described herein. In particular, the cross-section of FIG. 2A corresponds to the fast-axis direction of the optical emitters 110, while the cross-section of FIG. 2B corresponds to the slow-axis direction of the optical emitters 110. Moreover, FIGS. 2A and 2B illustrate the microlenses 120 as a first microlens element 122 followed along an optical path of the optical scanning apparatus 100 by a second microlens element 124, by way of example and not limitation. Specifically, in other examples (not illustrated), the second microlens element 124 may precede the first microlens element 122 along the optical path. The first and second microlens elements 122, 124 are both illustrated in FIGS. 2A and 2B as linear arrays of plano-cylindrical lenses. Also illustrated are the optical emitters 110 and the optical beams 102 that are produced by the optical emitters 110.

The optical beams 102 produced by the optical emitters 110, as illustrated in FIGS. 2A and 2B, diverge in a fast-axis direction of the optical emitters 110 at a half-width-half-maximum (HWHM) angle $\Delta_{FA}$ and further diverge in a slow-axis direction of the optical emitters 110 at a HWHM angle $\square_{SA}$. The optical beams 102 enter the first microlens element 122 at an input thereof. In general, the fast-axis and slow-axis HWHM divergence angles $\square_{FA}$, $\square_{SA}$ at the first microlens element 122 input are a function of various optical properties of the optical emitter 110. For example (as illustrated), when an array of edge emitting laser diodes is employed as the optical emitters 110 to produce the optical beams 102, the fast-axis and slow-axis HWHM divergence angles $\square_{FA}$, $\square_{SA}$ at the first microlens element 122 input or equivalently at an output of the optical emitters 110 may be about 12 degrees and 5 degrees, respectively. In other examples (not illustrated), the fast-axis HWHM divergence angle $\square_{FA}$ may be similar to the HWHM slow-axis divergence angle $\square_{SA}$.

According to the example of FIGS. 2A and 2B, the first microlens element 122 has a first associated magnification to provide fast-axis direction convergence of the corresponding optical beam 102. In particular, as the optical beam 102 passes through the first microlens elements 122, an optical power of the first microlens elements 122 transforms or converges the optical beams 102 to provide an adjusted fast-axis HWHM convergence angle $\square'_{FA}$ at an output of the first microlens element 122 (FIG. 2A). The slow-axis HWHM angle $\square_{SA}$ of the optical beams 120 is substantially unaffected by passage through the first microlens elements 122 (FIG. 2B). Similarly, the second microlens element 124 has a second associated magnification to provide slow-axis direction convergence of the corresponding optical beam 102. In particular, as the optical beam 102 passes through the second microlens elements 124, an optical power provided by the second microlens elements 124 transforms or converges the optical beams 102 to provide an adjusted slow-axis HWHM convergence angle $\square'_{SA}$ at an output of the second microlens elements 122 in FIG. 2B. The fast-axis HWHM angle $\square'_{FA}$ of the optical beams 120 is substantially unaffected by passage through the second microlens elements 122 in FIG. 2A.

After passing through both the first and second microlens elements 122, 124 that comprise the microlenses 120, both of the fast-axis and slow-axis HWHM divergence angles $\square_{FA}$, $\square_{SA}$ have been transformed into the fast-axis and slow-axis output HWHM convergence angles $\square'_{FA}$, $\square'_{SA}$ by the optical powers of the microlenses 120. For example, if both of the first and second microlens elements 122, 124 collectively provide about a 16:1 magnification in the fast-axis direction, the fast-axis HWHM convergence angle $\square'_{FA}$ at the output of the microlenses 120 will be about 0.76 degrees for the 12 degree HWHM input angle example above. Furthermore, while the HWHM divergence angles $\square_{FA}$, $\square_{SA}$ of the optical beams 102 are converted to the HWHM convergence angles $\square'_{FA}$, $\square'_{SA}$, a spacing between the central rays of optical beams 102 is substantially unaffected by the microlenses 120, since no two optical beams 102 share a common microlens 120 of the plurality.

Hence, the optical emitters 110 have been individually imaged according to the beam transformations of the first and second microlens elements 122, 124 to form the intermediate image 112 comprising a plurality of spots in the intermediate image plane 114. However, the array of optical emitters 110 has been imaged with substantially unity array magnification, as described above. Moreover, employing separate first and second microlens elements 122, 124 to perform separate reimaging in both orthogonal directions (e.g., fast-axis and slow-axis or in-scan and cross-scan) to produce the intermediate image 112 may facilitate astigmatism compensation. Astigmatism may be present in the beams produced by the emitters and may also result from variations in microlens parameter tolerances such as radii, glass specification, thickness variations, etc.

In another example, each microlens 120 of the plurality comprises a single microlens element having a first surface to provide fast-axis direction convergence of the optical beam 102 and a second surface to provide slow-axis direction convergence of the optical beam 102. For example, the first surface of the microlens element may be a surface adjacent to the optical emitters 110 having a cylindrical lens shape that is oriented to provide optical power in the fast-axis scan direction. The second surface may be a surface opposite the first surface having a cylindrical lens shape that is oriented to provide optical power in the slow-axis scan direction. The two surfaces, acting together, provide the optical power of the microlenses 120 in both the fast-axis and the slow-axis directions.

Figure 3A:
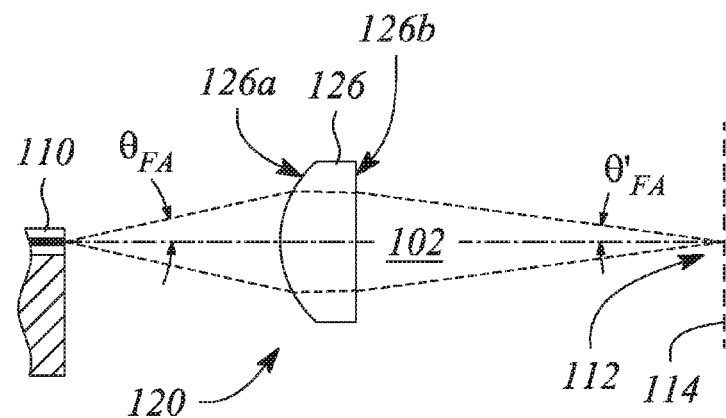
FIG. 3A illustrates a cross-sectional view through microlenses, according to another example of the principles described herein.
Figure 3B:
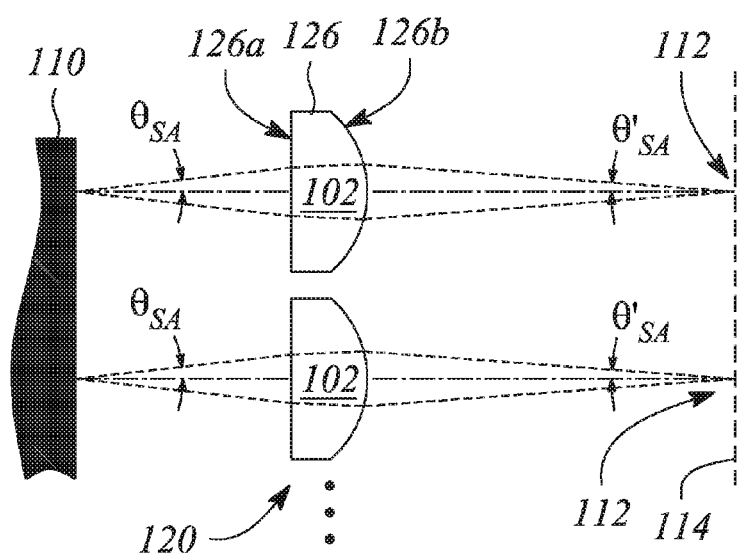
FIG. 3B illustrates a cross-sectional view through the microlenses of FIG. 3A in a direction perpendicular to the cross-section direction of FIG. 3A, according to another example of the principles described herein.

FIG. 3A illustrates a cross-sectional view through the microlenses 120, according to another example of the principles described herein. FIG. 3B illustrates a cross-sectional view through the microlenses 120 of FIG. 3A in a direction perpendicular to the cross-sectional direction of FIG. 3A, according to another example of the principles described herein. In particular, the cross-section of FIG. 3A corresponds to the fast-axis direction of the optical emitters 110, while the cross-section of FIG. 3B corresponds to the slow-axis direction of the optical emitters 110. Moreover, FIGS. 3A and 3B illustrate the microlenses 120 each as a single element microlens 126 having a first surface 126a and an opposing second surface 126b, by way of example. As illustrated, the first surface 126a provides optical power in the fast-axis direction (FIG. 3A), while the second surface 126b provides the optical power in the slow-axis direction (FIG. 3B). The single element microlenses 126 are illustrated in FIGS. 3A and 3B as a linear array of microlenses each having a cylindrical first surface 126a and an opposing cylindrical second surface 126b, wherein the cylindrical axes of the first and second surfaces are mutually perpendicular. In other examples, the surfaces of microlenses 120 are acylindrical surfaces, each having a cross-sectional shape determined by a conic constant or a polynomial function rather than by only a radius. Also illustrated are the optical emitters 110 and the optical beams 102 that are produced by the optical emitters 110.

As with the example above involving the two separate microlens elements 122, 124, the HWHM divergence angles $\Box_{FA}$, $\Box_{SA}$ of the optical beams 102 at the input of the microlenses 120 illustrated in FIGS. 3A and 3B are transformed or converged into the respective HWHM convergence angles $\Box'_{FA}$, $\Box'_{SA}$ by passage of the optical beams 102 through the two-surface single element microlenses 126. However, in the example of FIGS. 3A and 3B, the first surface 126a converges the optical beam 102 in the fast-axis direction producing little or no effect in the slow-axis direction in FIG. 3A, while the second surface 126b converges the optical beams 102 in the slow-axis direction producing little or no effect in the fast-axis direction in FIG. 3B. Acting together, the first and second surfaces 126a, 126b provide the optical power of the single element microlenses 120 in both the fast-axis and the slow-axis directions.

The optical power of the microlenses 120 enables the microlenses 120 to image the optical emitter 110 onto the intermediate image plane 114 in the fast-axis and slow-axis directions at the respective associated magnifications to produce the appropriate marginal ray angles and corresponding spot sizes in the final image at the scanning surface 104. The microlens associated magnifications that apply to the imaging of an optical emitter onto the intermediate image plane 114 were previously given above as equations (2) and (3). In terms of the HWHM divergence angles $\Box_{FA}$, $\Box_{SA}$ and the HWHM convergence angles $\Box'_{FA}$, $\Box'_{SA}$, equations (2) and (3) may be rewritten as equations (2a) and (3a).

$$M_{Fast} = \frac{\tan(\theta_{FA})}{\tan(\theta'_{FA})} \quad (2a)$$

$$M_{Slow} = \frac{\tan(\theta_{SA})}{\tan(\theta'_{SA})} \quad (3a)$$

As an example, if the first and second surfaces 126a, 126b of the two-surface single element microlenses 126, acting together, provide the fast-axis magnification $M_{Fast}$ of 16, (i.e., 16:1) in the fast-axis direction and the input beam HWHM angle is $\Box_{FA}$ is 12 degrees, the HWHM divergence angle $\Box'_{FA}$ at the output of the microlenses 120 will be about 0.76 degrees.

In another example, each microlens 120 of the plurality comprises a gradient index microlens element (not illustrated). A gradient index microlens element has a refractive index that varies as a function of position within the lens. A gradient index microlens may, for example, have a cross-sectional shape and a cross-sectional refractive index distribution that are substantially the same for all cross-sections of the microlens perpendicular to a symmetry direction. When the symmetry direction of a gradient index microlens is aligned parallel to a slow-axis direction of an edge emitting laser diode array, for example, the microlens has optical power in a fast-axis direction and may form an intermediate image of the optical emitters 110 in a fast-axis direction on the intermediate image plane 114. In another example, each microlens 120 of the plurality comprises a diffractive microlens element (not illustrated). A diffractive microlens element has at least one diffractive surface wherein optical power is provided by an arrangement of surface-height steps that impart a desired phase distribution on a transmitted or reflected wavefront and thereby provide optical power analogous to that of a conventional refractive lens.

As has been discussed above, the microlens associated magnifications $M_{Fast}$ and $M_{Slow}$ do not substantially affect the separation of illumination spots 106 at the final image when the magnification $M_{Array}$ is substantially equal to unity. Thus, the microlens associated magnifications $M_{Fast}$ and $M_{Slow}$ may be selected solely for the purpose of determining the illumination spot size at the final image when acting in combination with the reimaging magnifications $M_{In-Scan}$ and $M_{Cross-scan}$ of the subsequent optical components (e.g., see discussion below). Moreover, the array magnification $M_{Array}$ of the microlenses 120 (e.g. as an array), when set substantially equal to unity, has substantially no effect on the illumination spot size or the illumination spot separation distance at the final image. Thus, the reimaging magnification $M_{Reimaging}$, particularly its cross-scan component $M_{Cross-Scan}$, may be selected solely for the purpose of determining a size of the final image (i.e., specifically an illumination spot separation distance in the cross-scan direction at the scanning surface 104).

According to some examples, a value of the array magnification $M_{Array}$ provided by the plurality of microlenses 120 to form the intermediate image 112 of the array of optical emitters 120 is substantially equal to unity, as noted above. That is, the array magnification $M_{Array}$ may be about 1.0. In these examples, a 1:1 intermediate image 112 of the optical emitter array may be formed at the intermediate image plane 114. Such unit-magnification imaging between the optical emitter array 110 and the intermediate image 112 may enable the use of an optical emitter array theoretically having an unlimited number of emitters, for example. The intermediate image of the optical emitter array may be a real image formed by beams converging toward real foci after emerging from a plurality of microlenses, or the intermediate image may be a virtual image formed by optical beams diverging from apparent or virtual foci after emerging from a plurality of microlenses.

More specifically, the array magnification $M_{Array}$ value of about 1.0 may facilitate a uniformly high efficiency collection of light produced by each optical emitter 110 of the array regardless of the number of emitters in the array, for example. Further, light produced by each optical emitter 110 may be collected with consistently high wavefront quality (i.e., optical quality) at the intermediate image 112 for substantially every optical emitter 110 in the array. Furthermore, the plurality of microlenses 120 may be manufactured as an array of substantially identical microlens elements having a substantially uniform element-to-element spacing about equal to an optical emitter spacing in the array of optical emitters 110. Additionally, the array magnification $M_{Array}$ of about 1.0 may facilitate installation and alignment of the plurality of microlenses 120 relative to the optical emitter 110 array without regard for which microlens element corresponds with which optical emitter 110 in the optical emitter 110 array. Moreover, small errors in the installation and alignment of a microlenses 120 relative to the array of optical emitters 110 may not substantially affect the magnification of the intermediate image 112 when the array magnification $M_{Array}$ is about 1.0, according to some examples.

Hence, an array magnification of the plurality of microlenses 120 that is substantially unity, when used as an element in the optical scanning apparatus 100, may facilitate the use of very large arrays of optical emitters 110, including large linear arrays. A large array of optical emitters 110, in turn, allows for a large array of illumination spots 106 to be imaged as the final image on the scanning surface 104. Further, the large linear arrays of illumination spots 106, according to examples of the principles described herein, are particularly useful when oriented in the cross-scan direction where high quality optical performance is achievable and where the disadvantages of focal plane separation and large wavefront aberrations may be reduced or in some examples minimized.

Referring again to FIGS. 1A and 1B, the optical scanning apparatus 100 further comprises a collimator 130. According to some examples, the collimator 130 is an adjustable collimator 130. The collimator 130 receives the optical beams 102 emerging from the intermediate image 112 formed by the plurality of microlenses 120. In some examples, the collimator 130 substantially collimates the optical beams 102. The collimator 130 further transmits the received optical beams 102 to subsequent portions of the optical scanning apparatus 100, as described below.

In addition to receiving and collimating the optical beams 102, the adjustable collimator 130 establishes an adjustable spacing between the illumination spots 106. In particular, the adjustable collimator 130 has a focal length that determines a propagation direction of each of the optical beams 102 at an output of the adjustable collimator 130. The focal length of the adjustable collimator acts as a scaling factor to determine the spacing between the illumination spots 106 at the scanning surface 104. Moreover, while other optical components (e.g., other lenses, etc.) of the optical scanning apparatus 100 may affect the spacing of the illumination spots 106, the focal length of the adjustable collimator 130 may be initially selected and subsequently adjusted to determine the spacing of the illumination spot 106 when used in combination with the other optical components.

In some examples, a focal length of the adjustable collimator 130 is predetermined and substantially fixed. For example, a value of the focal length may be selected (e.g., during design or manufacturing) and then subsequently employed as the fixed focal length. The value is selected to produce a predetermined target spacing between the illumination spots 106 produced by the optical beams 102 in the final image on the scanning surface 104. As such, the adjustable collimator 130 is only adjusted until the predetermined or target spacing has been achieved.

In other examples, the focal length of the adjustable collimator 130 is variable or adjustable in situ or in real-time. In particular, the focal length of the adjustable collimator 130 is adjustable to facilitate varying the spacing between the illumination spots 106, during operation of the optical scanning apparatus 100. In some examples, the focal length of the adjustable collimator 130 is adjustable about a central value of that focal length over a range between about plus five percent and about minus five percent of a central value of the focal length. For example, the central value of the focal length may be a value that produces a predetermined or desired spacing of the illumination spots 106 for a typical condition or location of the scanning surface 104. The central value may be equivalent to a value selected for the adjusted and then fixed focal length above, for example.

In some examples, the focal length of the adjustable collimator 130 is adjustable according to a measured spacing of the illumination spots 106 on the scanning surface 104. In some examples, the measured spacing is provided by a real-time feedback measurement system. For example, a measurement of the spacing of the illumination spots 106 may be made at an end of or between scans by the optical scanning apparatus 100. In another example, the measurement may be made during a scan. According to various examples, the spacing measurement may be made using a camera or a similar imaging system and such imaging system may also include mirrors, prisms and auxiliary lenses. A feedback control system (e.g., a servo-control system) may be used to process the spacing measurement and control the adjustable focal length of the adjustable collimator 130, for example. The feedback control system may be implemented to provide the control in real-time as the optical scanning apparatus 100 scans the illumination spots 106, according to various examples.

The optical scanning apparatus 100 further comprises a beam scanner 140, according to some examples. The beam scanner 140 is configured to scan the optical beams 102 in the in-scan direction 108. According to various examples, the beam scanner 140 comprises a movable portion 142. The movable portion 142 cause a direction of the optical beams 102 to change through a mechanical motion of the movable portion 142, according to some examples. In some examples, the movable portion 142 of the beam scanner 140 comprises a rotating polygon 142. Surfaces of the rotating polygon 142 are mirrored to reflect the optical beams 102 incident on the polygon surfaces. As an angle of incidence of optical beams 102 on the rotating mirrored polygon 142 changes due to the rotation, a reflection angle of the optical beams 102 similarly changes according to the law of reflection. The changing incidence and reflection angles scan the optical beams 102 and also the illumination spots 106 produced by the optical beams 102 across the scanning surface 104 in the in-scan direction. The beam scanner 140 that employs the rotating mirror polygon may be referred to as a rotatable scanner 140, according to some examples.

In other examples, the beam scanner 140, as defined herein, employs another type of movable portion 142 other than the rotating polygon. For example, the movable portion 142 may comprise a mirror mounted on a pivot and moved about the pivot by an actuator. In yet other examples, the beam scanner 140 may employ one or more of a movable prism and an optical waveguide as the movable portion 142 to scan the optical beams 102 in the in-scan direction.

In some examples, the beam scanner 140 may comprise other optics in addition to the rotating polygon, movable mirror, and movable prism of the movable portion 142. In particular, in some examples the beam scanner 140 further comprises other optics including, but not limited to, a fixed mirror 144 and a pre-scan cylinder lens 146. The fixed mirror 144 may be used to redirect the optical beams 102 as illustrated in FIG. 1B, according to some examples. The fixed mirror 144 may be located in any of several locations along an optical path followed by the optical beams 102.

The pre-scan cylinder lens 146 is a cylindrical lens configured to bring each of the optical beams 102 into a 'line focus' (i.e., a one-directional focus) at a moving surface of the movable portion 142 of the beam scanner 140. The pre-scan cylinder lens 146 is located in the optical path between the adjustable collimator 130 and the movable portion 142 of the beam scanner 140, for example. The pre-scan cylinder lens 146 substantially focuses the optical beams 102 in the cross-scan direction 109 at a surface of the movable portion 142 such that a cross-scan position of an illumination spot formed by an optical beam 102 on the scanning surface 104 becomes substantially insensitive to facet-to-facet tilt differences or wobble of the polygon mirrors in the cross-scan direction, for example.

Figure 4A:
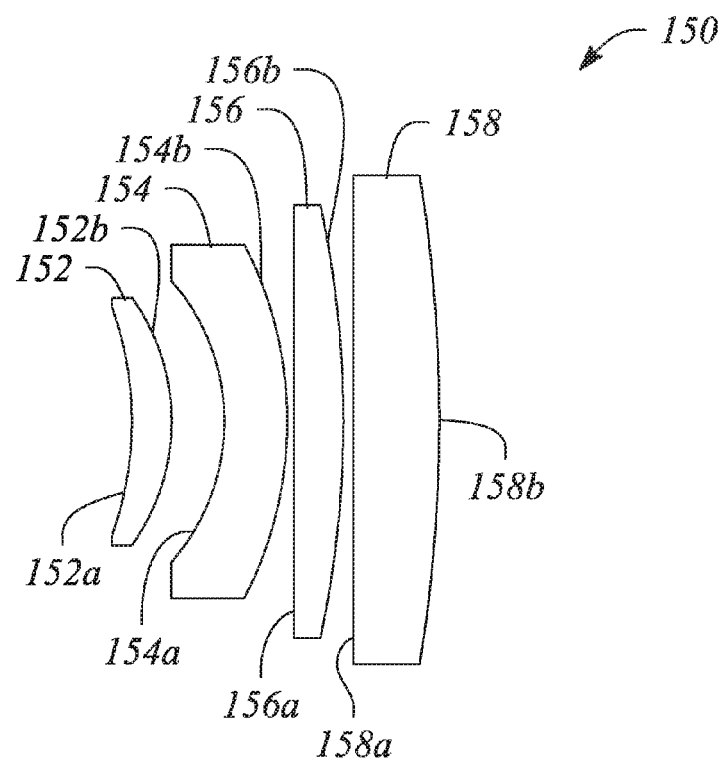
FIG. 4A illustrates a cross-sectional view of a scan lens, according to an example of the principles described herein.
Figure 4B:
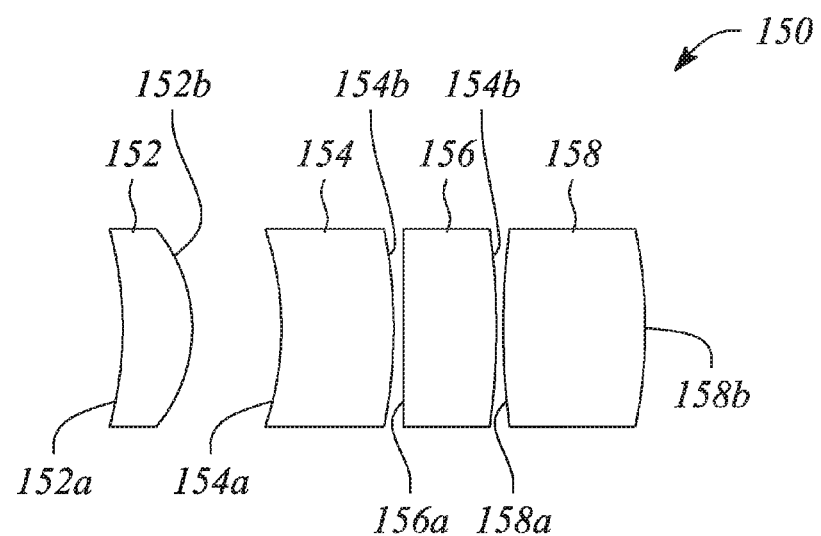
FIG. 4B illustrates a cross-sectional view of the scan lens of FIG. 4A in a direction perpendicular to the cross-section direction of FIG. 4A, according to an example of the principles described herein.

In some examples, the optical scanning apparatus 100 further comprises a scan lens 150 between the beam scanner 140 and the scanning surface 104. The scan lens 150 is configured to focus the optical beams 102 onto the scanning surface 104. The scan lens 150 may be anamorphic, according to various examples. In some examples, the scan lens 150 is a four-element lens. FIG. 4A illustrates a cross-sectional view of the scan lens 150, according to an example of the principles described herein. FIG. 4B illustrates a cross-sectional view of the scan lens 150 of FIG. 4A in a direction perpendicular to the cross-section direction of FIG. 4A, according to an example of the principles described herein.

In some examples, the scan lens 150 comprises a first lens element 152 having an optical power in the in-scan direction and having another optical power in a cross-scan direction, according to some examples. In general, the in-scan direction optical power of the first lens element 152 may be positive, zero, or negative. The other optical power of the first lens element 152 in the cross-scan direction is both positive and greater in magnitude than the in-scan direction optical power of the first lens element 152. A first surface 152a of the first lens element 152 may be rotationally symmetric, in some examples. In other examples, the first surface 152a may be anamorphic. As illustrated, the first surface 152a is concave. In other examples, the first surface 152a may be planar or convex. A second surface 152b of the first lens element 152 is an anamorphic surface having a radius of curvature in the cross-scan direction that is smaller in magnitude than a radius of curvature in the in-scan direction. In some examples, the second surface 152b may be toric.

In some examples, the scan lens 150 further comprises a second lens element 154. The second lens element 154 has a negative optical power both in the in-scan direction and in the cross-scan direction. In some examples, the negative optical powers differ in magnitude from one another in the in-scan and the cross-scan directions. In other examples, the negative optical powers in the in-scan and the cross-scan directions have about the same magnitude. As illustrated, the second lens element 154 has a first surface 154a that is concave in both of the in-scan and the cross-scan directions. In some examples, the first surface 154a may be rotationally symmetrical while in other examples the first surface 154a is anamorphic. A second surface 154b of the second lens 154 is illustrated as a convex surface and may be either a rotationally symmetric convex surface or an anamorphic surface, according to different examples.

In some examples, the scan lens 150 further comprises a third lens element 156 having a positive optical power both in the in-scan direction and in the cross-scan direction. In some examples, the positive optical powers differ in magnitude from one another in the in-scan and the cross-scan directions. In other examples, the positive optical powers in the in-scan and the cross-scan directions have about the same magnitude. A first surface 156a of the third lens element 156 is illustrated as a planar surface. In other examples, the first surface 156a may be convex or concave and further may be either rotationally symmetric or anamorphic. A second surface 156b of the third lens element 156 is illustrated as a rotationally symmetric convex surface. In other examples, the second surface may be either planar or concave and further may have an anamorphic shape.

In some examples, the scan lens 150 further comprises a fourth lens element 158 having an optical power in the in-scan direction and another optical power in the cross-scan direction. The cross-scan direction optical power of the fourth lens element 158 is both positive and greater than the in-scan direction optical power of the fourth lens element 158. In general, the in-scan direction optical power of the fourth lens element 158 may be positive, zero, or negative. Further, at least one of a first surface 158a and a second surface 158b of the fourth lens element 158 is an anamorphic surface. In FIGS. 4A and 4B, the first surface 158a is illustrated as having a convex cylindrical surface with a curvature in only the cross-scan direction. In other examples, the first surface 158a may be toric or otherwise anamorphic with a radius of curvature in the cross-scan direction that is smaller in magnitude than a radius of curvature in the in-scan direction. Further as illustrated, the second surface 158b is rotationally symmetric. In other examples, the first surface 158a is rotationally symmetric. In these examples, the second surface 158b may be a convex toric, convex cylindrical, or another anamorphic surface having a radius of curvature in the cross-scan direction that is smaller in magnitude than a radius of curvature in the in-scan direction. In yet other examples, both of the first and second surfaces 158a, 158b are anamorphic surfaces that together are configured to provide a greater optical power in cross-scan direction than in the in-scan direction.

Further, in some examples, the second lens element 154 comprises a material having a higher index of refraction than a material of the first, third and fourth lens elements 152, 156, 158. In some examples, the index of refraction of the materials of the first, third and fourth lens elements 152, 156, 158 are about equal to one another. In other examples, the first, third and fourth lens elements 152, 156, 158 comprise materials having different refractive indexes.

The first lens element 152, the second lens element 154, the third lens element 156, and the fourth lens element 158 are optically positioned in ascending numeric order between the beam scanner 140 and the scanning surface 104. In other words, the optical beams 102 propagate through the scan lens 150 beginning with the first lens element 152 followed sequentially by the second lens element 154, the third lens element 156 and the fourth lens element 158. The optical beams 120 exit the scan lens 150 after passing through the fourth lens element 158. As such, the first lens element 152 is adjacent or closer to the beam scanner 140 while the fourth scan lens 158 is adjacent or closer to the scanning surface 104. Furthermore, first surfaces 152a, 154a, 156a, 158a of the respective lens elements 152, 154, 156, 158 are oriented to be pointing toward, and therefore are respectively closer to, the beam scanner 140. Moreover, the second surfaces 152b, 154b, 156b, 158b of the respective lens elements 152, 154, 156, 158 are oriented to be pointing toward, and therefore are respectively closer to, the scanning surface 104.

Figure 5:
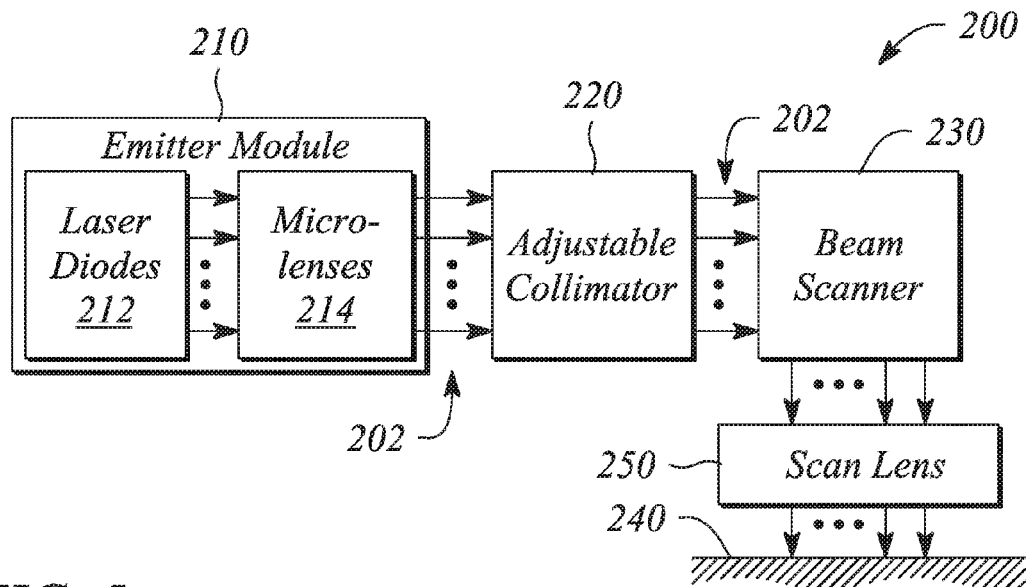
FIG. 5 illustrates a block diagram of a laser array scanning system, according to an example of the principles described herein.

FIG. 5 illustrates a block diagram of a laser array scanning system 200, according to an example of the principles described herein. The laser array scanning system 200 is configured to scan optical beams 202. The laser array scanning system 200 may be used in a printer to scan the optical beams 202 and produce scanned illumination spots on a photoconductive drum, for example.

The laser array scanning system 200 comprises an emitter module 210. The emitter module 210 is configured to provide a plurality of optical beams 202. According to some examples, the emitter module 210 comprises an array of laser diodes 212. According to some examples, the emitter module 210 further comprises a corresponding array of microlenses 214. The microlenses 214 of the corresponding array have an associated magnification. The associated magnification is selected to determine a spot size of an illumination spot formed by the corresponding optical beam 202. In some examples, the laser diodes 212 are substantially similar to the laser diodes described above with respect to the optical emitters 110 of the optical scanning apparatus 100. In some examples, the microlenses 214 are substantially similar to the microlenses 120 described above with respect to the optical scanning apparatus 100.

The laser array scanning system 200 further comprises an adjustable collimator 220 having a focal length. The focal length of the adjustable collimator 220 is variable to adjustably establish a spacing between the illumination spots produced by the optical beams 102. In some examples, the adjustable collimator 220 is substantially similar to the adjustable collimator 130 described above with respect to the optical scanning apparatus 100. In particular, the focal length of the adjustable collimator 220 may be varied or adjusted according to a measured spacing between the illumination spots. The spacing of the illumination spots may be measured in terms of a spacing between illumination spots on a scanning surface (e.g., as described below), for example. In another example, the spacing may be measured at some other point in an optical path of the laser array scanning system 200, including at an image of the scanning surface. The measured spacing may be provided by a real-time feedback measurement system, for example. In some examples, the focal length of the adjustable collimator 220 provides a focal length range between about plus five percent and about minus five percent around a central value of the focal length. For example, the focal length range may be between about plus three percent (+3%) and about minus three percent (−3%) around the central value.

The laser array scanning system 200 further comprises a beam scanner 230. The beam scanner 230 is configured to scan the optical beams 202 in an in-scan direction. In some examples, the beam scanner 230 is substantially similar to the beam scanner 140 described above with respect to the optical scanning apparatus 100. For example, the beam scanner 230 may comprise a rotating mirrored polygon.

The laser array scanning system 200 further comprises a scanning surface 240. The scanning surface 240 is configured to move in a cross-scan direction that is substantially perpendicular to the in-scan direction. In some examples, the scanning surface 240 comprises a surface of a photoconductive drum of a laser printer. Rotation of the photoconductive drum provides the cross-scan direction motion of the scanning surface 240. According to various examples, the illumination spots are imaged onto the scanning surface by the laser array scanning system 200. The illumination spots on the scanning surface 240 that are produced by the optical beams 202 are oriented in a row (i.e., a linear array) that is substantially parallel to the cross-scan direction, according to some examples.

In some examples, the laser array scanning system 200 further comprises a scan lens 250 between the beam scanner 230 and the scanning surface 240. The scan lens 250 is configured to focus the optical beams 202 onto the scanning surface 240. In some examples, the scan lens 250 is a four-element lens. In some of these examples, the scan lens 250 is substantially similar to the scan lens 150 described above with respect to the optical scanning apparatus 100.

In particular, according to some examples the scan lens 250 comprises a first lens element having an optical power in the in-scan direction and having another optical power in a cross-scan direction. The cross-scan direction optical power of the first lens element is both positive and greater than the in-scan direction optical power of the first lens element. The scan lens 250 further comprises a second lens element having a negative optical power in the in-scan direction and another negative optical power in the cross-scan direction. The scan lens 250 further comprises a third lens element having a positive optical power in the in-scan direction and another positive optical power in the cross-scan direction. The scan lens 250 further comprises a fourth lens element having an optical power in the in-scan direction and another optical power in the cross-scan direction. The cross-scan optical power of the fourth lens element is both positive and greater than the in-scan direction optical power of the fourth lens.

Figure 6:
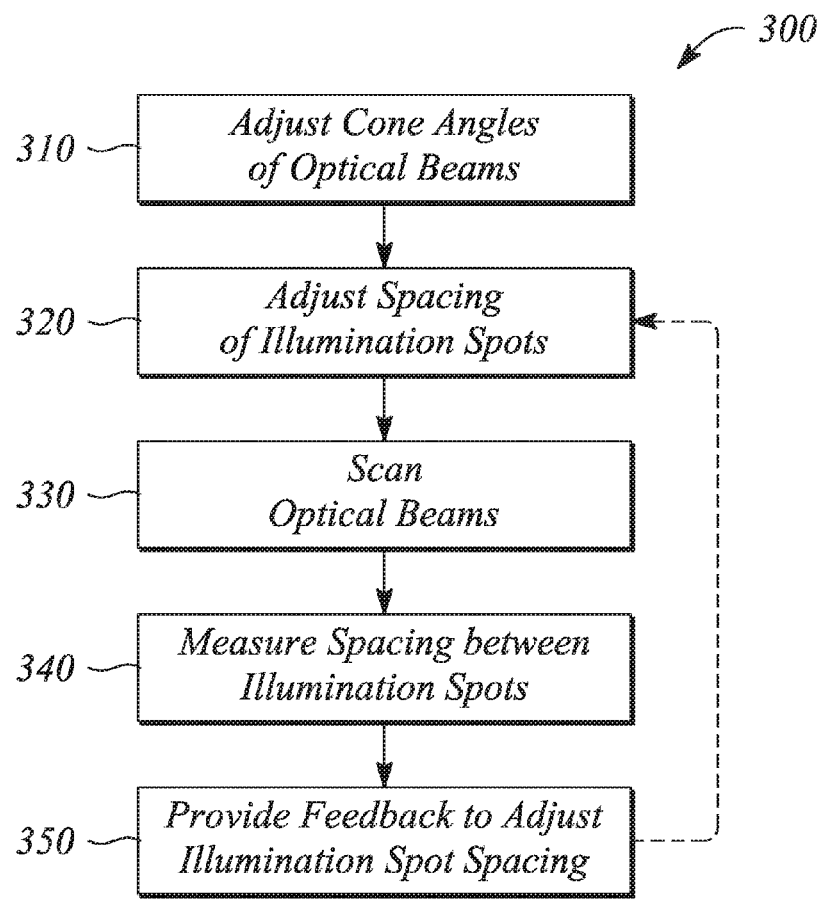
FIG. 6 illustrates a flow chart of a method of optical scanning, according to an example of the principles described herein.

FIG. 6 illustrates a flow chart of a method 300 of optical scanning, according to an example of the principles described herein. The method 300 of optical scanning comprises adjusting 310 cone angles of a plurality of optical beams emitted by an array of optical emitters to form an intermediate image of the array at substantially unity array magnification. The intermediate image is formed by individually imaging each of the optical emitters using a separate microlens. The intermediate image comprises a plurality of spots at an intermediate image plane. Each of the microlenses has an associated magnification, according to various examples. For example, the microlenses may be substantially similar to the microlenses 120.

The method 300 of optical scanning further comprises adjusting 320 a spacing between the illumination spots produced by the optical beams at the scanning surface. Adjusting 320 the spacing employs a selectable or adjustable focal length of optical elements through which all of the optical beams pass. Adjusting 320 the spacing is substantially separate from and independent of adjusting 310 the cone angles, according to various examples.

In some examples, adjusting 320 the spacing may employ a collimator and more particularly, an adjustable collimator to receive, and in some examples to substantially collimate, the optical beams from the intermediate image. The adjustable collimator provides the adjustable focal length. The adjustable collimator employed in adjusting 320 the spacing may be substantially similar to the adjustable collimator 130, described above with respect to the optical scanning apparatus 100.

The method 300 of optical scanning further comprises scanning 330 the optical beams in an in-scan direction to scan the illumination spots across the scanning surface. The in-scan direction is defined above with respect to the optical scanning apparatus 100. An arrangement of the illumination spots forms an image of the array at a magnification of less than unity on the scanning surface. According to some examples, the optical beams produce corresponding illumination spots in a linear arrangement on a scanning surface that are oriented substantially perpendicular to the in-scan direction. For example, scanning 330 the optical beams may employ a beam scanner comprising one or more of a rotating mirrored polygon, a pivoting mirror and a movable prism. In some examples, scanning 330 the optical beams may be provided by the beam scanner 140 described above with respect to the optical scanning apparatus 100.

In some examples, the method 300 of optical scanning further comprises measuring 340 the spacing between the illumination spots at the scanning surface. In some examples, measuring 340 the spacing may be performed in between scanning 330 the optical beams. For example, measuring 340 the spacing may comprise measuring the spacing of the illumination spots at the scanning surface using an optical sensor (e.g., a camera). The optical sensor may be positioned to receive the optical beams from a vicinity of the scanning surface at either a beginning or an end of a scan, for example. In other examples, measuring 340 the spacing is performed during scanning 330 the optical beams (e.g., during a scan) by intercepting and sampling the optical beams. The spacing between the illumination spots or equivalently the spacing of the optical beams themselves may be measured 340 using a camera or a similar imaging system, for example.

In some examples, the method 300 of optical scanning further comprises providing 350 feedback to change the focal length and to adjust 320 the spacing. For example, providing 350 feedback may be used to control the variable or adjustable focal length of the adjustable collimator. According to various examples, the feedback may be provided 350 one or both of during and between successive scans of a plurality of scans of the optical beams provided by scanning 330. The feedback may be provided 350 by a servo-mechanical control system, for example.

Thus, there have been described examples of an optical scanning apparatus, a laser array scanning system and a method of optical scanning that employ an optical emitter array coupled to microlenses to enable independent control of beam spacing and illumination spot size. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. An optical scanning apparatus comprising:
an array of optical emitters to provide a plurality of optical beams;
a plurality of corresponding microlenses to receive the optical beams; and
a variable collimator to receive the plurality of optical beams from the microlenses;
wherein the microlenses and variable collimator are arranged to decouple illumination spot size of the optical beams from illumination spot separation of the optical beams such that illumination spot size and the illumination spot separation at a scanning surface are independently controllable.

2. The optical scanning apparatus of claim 1, wherein each microlens comprises a first microlens element having a first associated magnification to provide fast-axis direction convergence of the corresponding optical beam and a second microlens element having a second associated magnification to provide slow-axis direction convergence of the corresponding optical beam.

3. The optical scanning apparatus of claim 1, wherein each microlens has a first surface to provide fast-axis direction convergence of the optical beam and a second surface to provide slow-axis direction convergence of the optical beam.

4. The optical scanning apparatus of claim 1, wherein the optical emitters are edge emitting laser diodes and, wherein the microlenses reduce a magnitude of a half-width-half-maximum (HWHM) cone angle of the optical beams produced by the edge emitting laser diodes by at least a factor of ten at an output of the microlenses.

5. The optical scanning apparatus of claim 1, wherein a focal length of the variable collimator is adjustable between about plus five percent and about minus five percent around a central value of the focal length.

6. The optical scanning apparatus of claim 1, further comprising a feedback measurement system to measure a spacing of illumination spots on the scanning surface and control adjustment of a focal length of the variable collimator in response to the measured spacing of the illumination spots on the scanning surface.

7. The optical scanning apparatus of claim 1, further comprising
a beam scanner to scan the optical beams received from the collimator; and
a scan lens to focus the scanned optical beams to form an arrangement of illumination spots on the scanning surface, the arrangement of illumination spots forming an image of the array.

8. The optical scanning apparatus of claim 7, wherein the scan lens comprises:
a first lens element having an optical power in the in-scan direction and having an optical power in a cross-scan direction, the cross-scan direction optical power of the first lens element being both positive and greater than the in-scan direction optical power of the first lens element, the cross-scan direction being perpendicular to the in-scan direction;
a second lens element having a negative optical power in the in-scan direction and a negative optical power in the cross-scan direction;
a third lens element having a positive optical power in the in-scan direction and a positive optical power in the cross-scan direction; and
a fourth lens element having an optical power in the in-scan direction and an optical power in the cross-scan direction, the cross-scan optical power of the fourth lens element being both positive and greater than e in-scan direction optical power of the fourth lens element,
wherein the first, second, third, and fourth lens elements are optically positioned in ascending numeric order between the beam scanner and the scanning surface.

9. A method of operating the optical scanning apparatus of claim 1, the method comprising:
continuously adjusting illumination spot separation of the optical beams at a scanning surface to provide real-time scan line spacing control.

10. The method of claim 9, further comprising adjusting illumination spot separation by controlling a focal length of the variable collimator.

11. The method of claim 9, further comprising measuring illumination spot separation with a feedback measurement system, the feedback measurement system controlling the adjusting of illumination spot separation of the optical beams based on measured illumination spot separation.

12. The method of claim 11, further comprising:
scanning the optical beams across the scanning surface; and measuring the separation between the illumination spots at the scanning surface; and providing feedback to change a focal length of the collimator to adjust the separation between the illumination spots both of during a scan and between scans of a plurality of scans of the illumination spots.

13. The method of claim 9, wherein each microlens comprises separate first and second microlens elements to perform separate reimaging in orthogonal directions, the method further comprising compensating for astigmatism in a corresponding optical beam with the separate first and second microlens elements.

14. An optical scanning apparatus comprising:
an array of optical emitters to provide a plurality of optical beams;
a plurality of corresponding microlenses to receive the optical beams;
a variable collimator to receive the plurality of optical beams from the microlenses; and
a feedback system to measure a spacing of illumination spots of the optical beams at a scanning surface, the feedback system to control the variable collimator to adjust the spacing of the illumination spots at the scanning surface independent of illumination spot size.

15. The optical scanning apparatus of claim 14, wherein each microlens comprises a first microlens element having a first associated magnification to provide fast-axis direction convergence of the corresponding optical beam and a second microlens element having a second associated magnification to provide slow-axis direction convergence of the corresponding optical beam.

16. The optical scanning apparatus of claim 14, wherein each microlens has a first surface to provide fast-axis direction convergence of the optical beam and a second surface to provide slow-axis direction convergence of the optical beam.

17. The optical scanning apparatus of claim 14, wherein the optical emitters are edge emitting laser diodes and, wherein the microlenses reduce a magnitude of a half-width-half-maximum (HWHM) cone angle of the optical beams produced by the edge emitting laser diodes by at least a factor of ten at an output of the microlenses.

18. The optical scanning apparatus of claim 14, wherein a focal length of the variable collimator is adjustable between about plus five percent and about minus five percent around a central value of the focal length.

19. The optical scanning apparatus of claim 14, further comprising
a beam scanner to scan the optical beams received from the collimator; and
a scan lens to focus the scanned optical beams to form an arrangement of illumination spots on the scanning surface, the arrangement of illumination spots forming an image of the array.

20. The optical scanning apparatus of claim 14, wherein each microlens changes an ellipticity of a received optical beam.

* * * * *

UNITED STATES PATENT AND TRADEMARK OFFICE
CERTIFICATE OF CORRECTION

PATENT NO. : 10,078,216 B2  
APPLICATION NO. : 15/097886  
DATED : September 18, 2018  
INVENTOR(S) : Michael Plotkin et al.

Page 1 of 1

It is certified that error appears in the above-identified patent and that said Letters Patent is hereby corrected as shown below:

In the Drawings

In sheet 4 of 5, FIG. 4B, Line 2, delete "154b" and insert -- 156b --, therefor.

In the Claims

In Column 24, Line 46, Claim 8, delete "e" and insert -- the --, therefor.

Signed and Sealed this
Twenty-third Day of April, 2019

Andrei Iancu
*Director of the United States Patent and Trademark Office*